US009251496B2

(12) United States Patent
Brown (10) Patent No.: US 9,251,496 B2
(45) Date of Patent: Feb. 2, 2016

(54) LIGHT PULSE OBJECT IDENTIFICATION (71) Applicant: International Business Machines Corporation, Armonk, NY (US)

(72) Inventor: Michael Sean Brown, Wahroonga (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/189,070

(22) Filed: Feb. 25, 2014

(65) Prior Publication Data
US 2015/0242804 A1    Aug. 27, 2015

(51) Int. Cl.
*G06K 19/06* (2006.01)
*G06Q 10/08* (2012.01)

(52) U.S. Cl.
CPC ........ *G06Q 10/087* (2013.01); *G06K 19/06112* (2013.01)

(58) Field of Classification Search
CPC ....................... G06K 19/06112; G06Q 10/087
USPC .................................................. 235/385, 491
See application file for complete search history.

(56) References Cited

U.S. PATENT DOCUMENTS

| 6,867,701 | B2 | 3/2005 | Lawrence et al. | |
|---|---|---|---|---|
| 8,094,020 | B2 | 1/2012 | Groth et al. | |
| 8,223,015 | B2 | 7/2012 | Yuuki | |
| 8,499,067 | B2 | 7/2013 | Joukov | |
| 2007/0027981 | A1* | 2/2007 | Coglitore et al. | 709/224 |
| 2008/0204268 | A1* | 8/2008 | Dowling et al. | 340/815.45 |
| 2011/0239056 | A1* | 9/2011 | Adams | 714/48 |
| 2011/0298607 | A1 | 12/2011 | Priyantha et al. | |
| 2012/0031964 | A1* | 2/2012 | Thielmann et al. | 235/375 |
| 2012/0166693 | A1 | 6/2012 | Weinstock | |
| 2013/0223684 | A1* | 8/2013 | Townend et al. | 382/103 |

FOREIGN PATENT DOCUMENTS

JP    2012238116 A    12/2012

OTHER PUBLICATIONS

"Method to Enhance Serviceability of Blade Servers in a Data Center by Assisting the User in Identification of Blade Servers." IP.com. Jun. 25, 2013. http://ip.com/IPCOM/000228627D; 7 pgs.

(Continued)

*Primary Examiner* — Thien T Mai
*Assistant Examiner* — Toan Ly
(74) *Attorney, Agent, or Firm* — Brown & Michaels, PC; John R. Pivnichny (57) ABSTRACT

A method of identification of at least one asset having a LED using a camera with a display coupled to a computer. The camera records a series of frames over a period of time showing at least one asset and associated LED. The series of frames are analyzed to identify LEDs in each of the frames by detecting bright spots within the image exceeding a set threshold and/or within a set color range. For each of the LEDs identified in the frames, the changes of the LEDs in the frames over time are converted into a code. The code is looked up in a repository in a management system, where each code is associated with metadata of the managed asset. If the lookup was successful, displaying the associated metadata over at least one frame of an image on a display to a user, identifying the managed asset for the user.

20 Claims, 6 Drawing Sheets

(56) References Cited

OTHER PUBLICATIONS

"System and Method for Performing Light Path Diagnostics Using RFID." IP.com. Jan. 27, 2011. http://ip.com/IPCOM/000203514D; 4 pgs.

"Method and Apparatus for Integrating Physical Location in Server Management" IP.com. Apr. 27, 2012. http://ip.com/IPCOM/000216998D; 15 pgs.

"Method and process for server identification using light patterns" IP.com. Aug. 4, 2010. http://ip.com/IPCOM/000198318D; 4pgs.

* cited by examiner

LIGHT PULSE OBJECT IDENTIFICATION

BACKGROUND

The present invention relates to asset tracking, and more specifically to object identification for asset tracking.

Asset tracking takes place in warehouses, data centers, and other facilities, physical or otherwise. Asset tracking refers to tracking the movement of physical or non-physical assets. An asset tracking system can record the location and usage of the assets and generate various reports as required.

Asset management takes place in data centers. Data centers are facilities used to house computer systems and associated components, such as storage and telecommunication systems.

As data centers get larger and increasingly complex, it is increasingly difficult to accurately identify the different assets present and reconcile the assets with entries in an electronic asset database. Accuracy is important when changes are made to complex information technology (IT) infrastructure. A mistake, such as unplugging the wrong server, can have detrimental results, impacting revenue as well reputations of the customer and client.

Servers, appliances and network equipment, such as routers, switches, firewalls, and other equipment, typically do not have monitors attached, making it difficult to tell rows of similar devices apart. Conventionally, a sticky label with printed information including device name, asset number and making readable or scannable bar code is attached to the equipment. Over time, these labels can peel, fade, scratch, or otherwise become dislodged from the equipment. Human operators can also misread service names, especially when they consist of similar, seemingly meaningless sets of numbers and letters. Bar codes also only allow one asset at a time to be scanned and require the user to be in close proximity to the bar code.

SUMMARY

According to one embodiment of the present invention a method of identification of at least one asset having a light, using a camera coupled to a computer comprising at least one processor, one or more memories, one or more computer readable storage media, and a display. The method comprising: the computer receiving a series of frames recorded by the camera over a period of time showing at least one asset and associated light; the computer analyzing the series of frames to identify lights in each of the frames by detecting bright spots within the image exceeding a set threshold and/or within a set color range; for each of the lights identified in the frames, the computer converting changes in the lights in the frames over time into a code; the computer looking up the code in a repository in a management system, wherein each code is associated with metadata of the managed asset; and if the lookup was successful, the computer displaying the associated metadata over at least one frame of the image on a display to a user, identifying the managed asset for the user.

According to another embodiment of the present invention, a computer program product for identification of at least one asset having a light, using a camera coupled to a computer comprising at least one processor, one or more memories, one or more computer readable storage media, and a display, the computer program product comprising a computer readable storage medium having program instructions embodied therewith. The program instructions executable by the computer of the camera to cause the camera to perform a method comprising: receiving, by the computer, a series of frames recorded by the camera over a period of time showing at least one asset and associated light; analyzing, by the computer, the series of frames to identify lights in each of the frames by detecting bright spots within the image exceeding a set threshold and/or within a set color range; for each of the lights identified in the frames, converting, by the computer, the changes in the lights in the frames over time into a code; looking up, by the computer, the code in a repository in a management system, wherein each code is associated with metadata of the managed asset; and if the lookup was successful, displaying, by the computer, the associated metadata over at least one frame of the image on a display to a user, identifying the managed asset for the user.

According to another embodiment of the present invention, a computer system for identification of at least one asset having a light using a camera coupled to a computer comprising a display, at least one processor, one or more memories, one or more computer readable storage media having program instructions. The program instructions executable by the computer of the camera to cause the camera to perform the program instructions comprising: receiving, by the computer, a series of frames recorded by the camera over a period of time showing at least one asset and associated light; analyzing, by the computer, the series of frames to identify lights in each of the frames by detecting bright spots within the image exceeding a set threshold and/or within a set color range; for each of the lights identified in the frames, converting, by the computer, the changes in the lights in the frames over time into a code; looking up, by the computer, the code in a repository in a management system, wherein each code is associated with metadata of the managed asset; and if the lookup was successful, displaying, by the computer, the associated metadata over at least one frame of the image on a display to a user, identifying the managed asset for the user.

DETAILED DESCRIPTION

Figure 1:
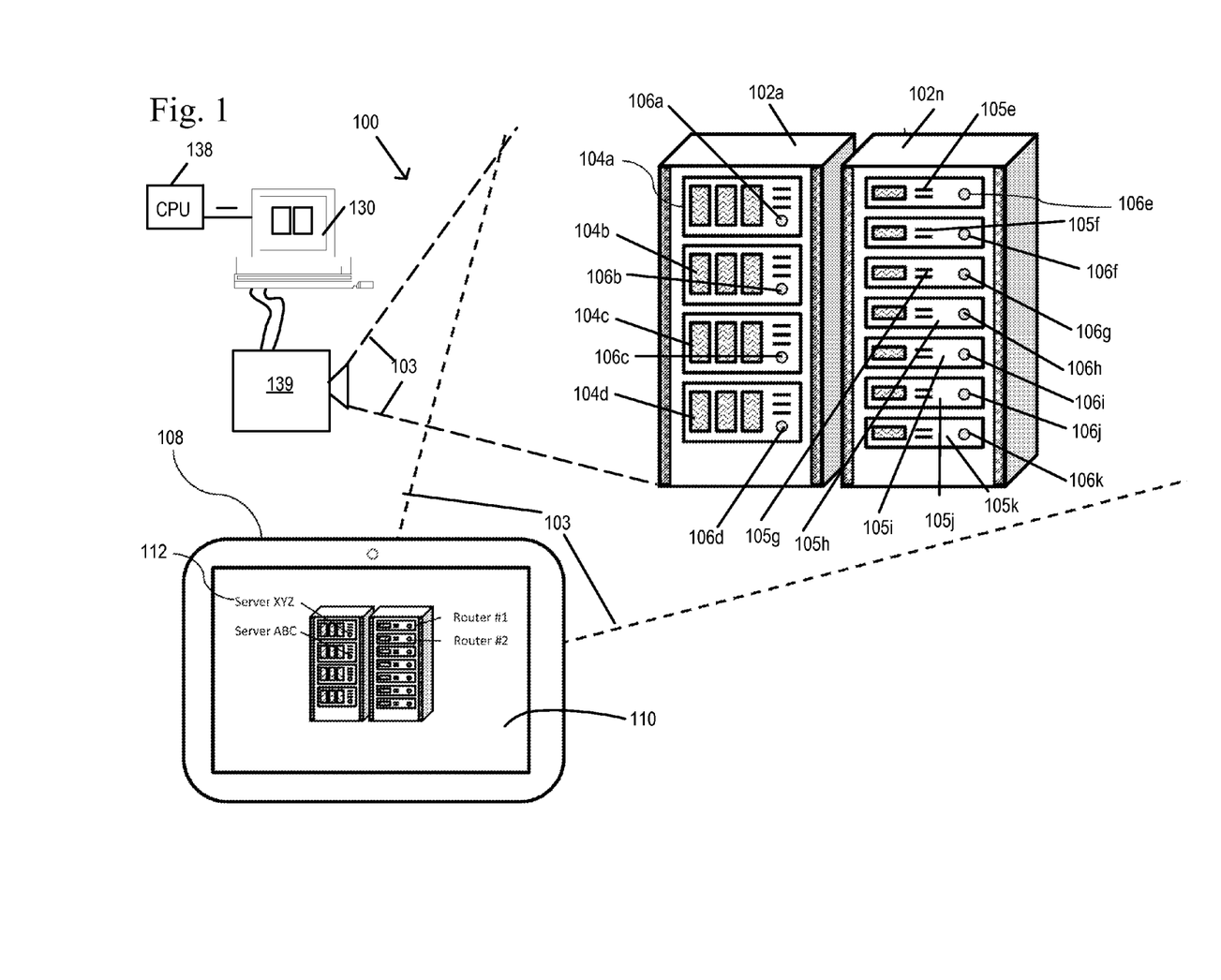
FIG. 1 shows managed devices in a computer room or data center and cameras for scanning multiple managed devices.

Referring to FIG. 1, managed devices 100 are present in a data center or a computer or server room. The managed devices 100 may be any device in the data center including, but not limited to, racks 102a-102n, servers 104a-104d, routers 105e-105k, network devices, and other devices. While FIG. 1 shows only two racks 102a, 102n, with each of the racks having multiple servers 104a-104d, and associated routers 105e-105k, and other equipment, additional equipment and quantities of equipment may be present in the data center or server or computer room. Each of the managed devices preferably has at least one processor coupled to one or more computer-readable memories and one or more computer-readable storage medium. It should be noted that a managed device may be an asset.

Data regarding the managed devices 100 is stored in a data repository 114, for example a configuration management database (CMDB) associated with an asset management system 116 and a change and problem management system 115.

The asset management system 116 manages the assets of the system.

The change and problem management system 115 manages and controls changes made to the system being managed through the CMDB 114. The CMDB 114 manages the changes to the system by tracking Configuration Items (CIs) and the dependencies between them. The CIs represent the assets or things that are worth tracking and managing, such as but not limited to computers, software, software licenses, racks, network devices, storage, the components within such items, and other assets.

Light emitting diodes (LEDs) 106a-106n are present on each managed device 100 emitting visible light which can be varied to carry identification data encoded on the light.

Each of the managed devices 100 is assigned or associated with a unique code, which is capable of being presented by light pulses through LEDs over a specific duration. The LEDs 106a-106n may emit a single color or multiple colors in a pre-defined pattern, for example a number sent in a binary on-off code, or perhaps a code involving a plurality of colors which could encode more than one binary digit at a time. For example, single color LED could flash "on" for "1" and "off" for "0", while a multi-color LED could flash red for "1" and green for "0" in a single-binary digit code, or it could be off for "00", red for "01", green for "10" and yellow (red plus green) for "11".

The circuitry driving the LEDs on the managed devices may be updated remotely to display the assigned unique code. The light pulses used to represent the unique code for each of the managed devices 100 is preferably pulsed rapidly enough that to a user's human eye, the LED 106a-106k appears to be displaying a steady light. The pulsing of the LEDs 106a-106k to represent the unique code of each of the managed devices 100 may occur continuously, or could be initiated as determined by the user, for example during deployment of a managed device, during an audit, or when changing of the device.

Figure 2:
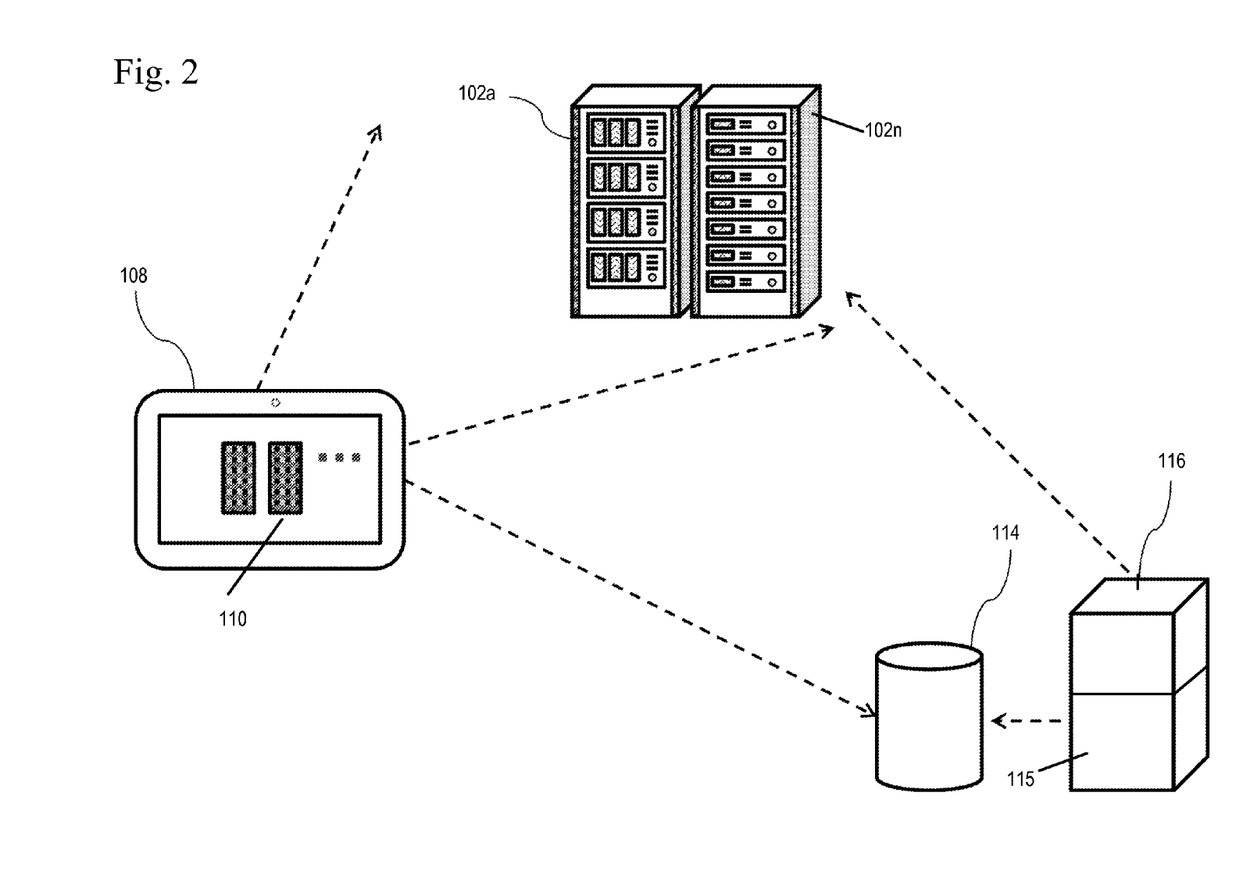
FIG. 2 shows a change of the managed devices in the computer room or data center.

Referring to FIGS. 1-2, a camera 139 can be mounted so that its field of view 103 can scan multiple managed devices 100. Camera 139 is linked to a processor 138 coupled to one or more computer-readable memories and one or more computer-readable storage medium and a display 130. Alternatively, a camera 109 (not shown) could be part of a mobile device 108 such as a tablet or smartphone which has at least one processor coupled to one or more computer-readable memories and one or more computer-readable storage medium. The camera 139 or 109 images the LEDs 106a-106k, and the processor 138 or mobile device 108 uses the identification encoded through the LEDs to identify the multiple devices scanned. Stability of the images or video taken by the user may be enhanced to correct or allow for movement of the mobile device by the user during capture of an image of the managed devices.

Figure 3:
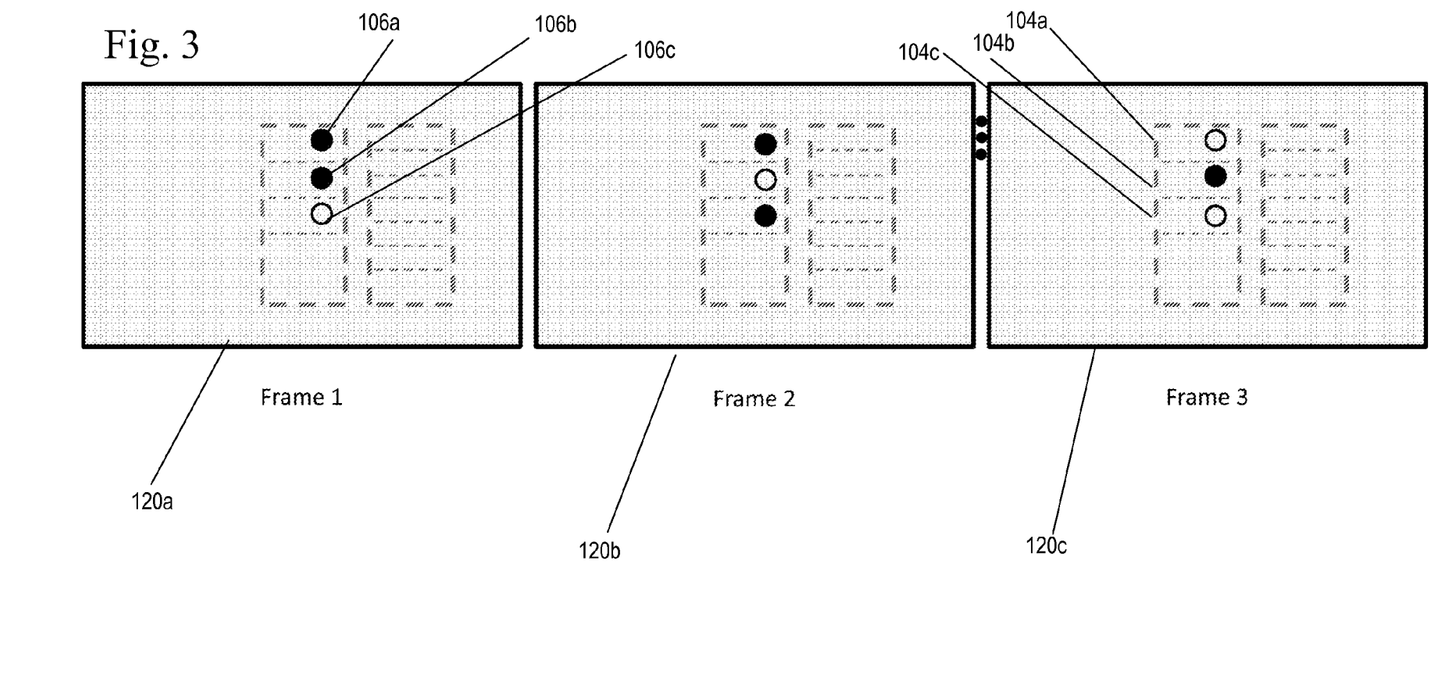
FIG. 3 shows a simplified example of the frames the camera can see and how the patterns of light pulses can be decoded into simple binary identification numbers unique to the device(s) being scanned.

Referring to FIG. 3, the image captured by camera 139 or 109 (not shown) is in the form of successive frames 120a-120n taken at intervals over a period of time. The processor 138 or mobile device 108 isolates the LEDs 106a-106c within the overall image by locating bright spots over a certain threshold and/or within a certain color range. An image map of where the bright spots over a certain threshold are present may be generated. The identification code of each device is then decoded by detecting differences between the spots over time, through analyzing subsequent frames 120a-120n. The unique identification of each visible device is then determined through lookup of the code in an asset database 116, and device names or other metadata 112 can be retrieved from the database 116.

The identification can be displayed on display 130 of the fixed system or screen 110 of the mobile device 108 as an overlay of the names and/or metadata 112 of the multiple devices 100 shown on the scanned image based on where the bright spots were located on the generated image map.

Figure 4:
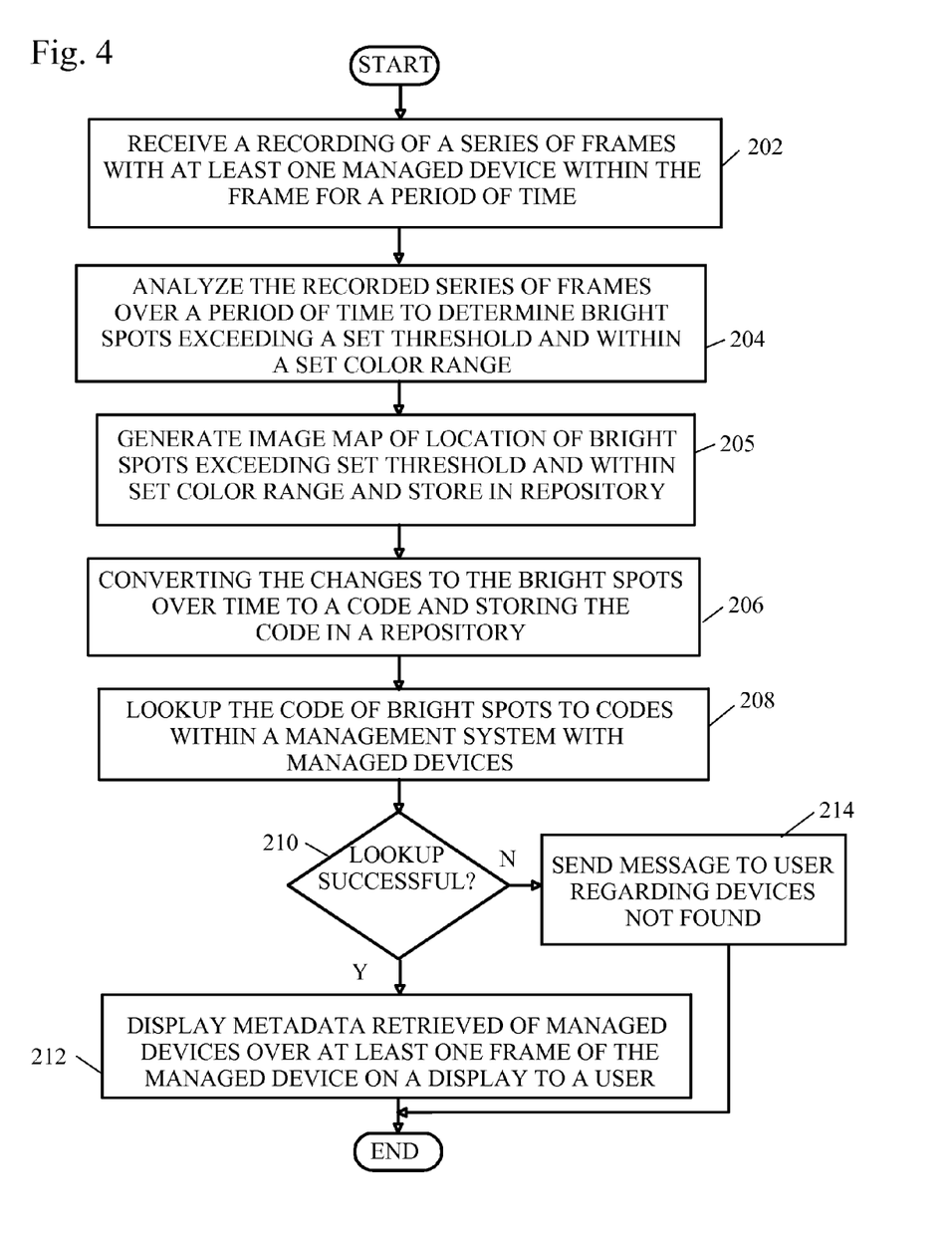
FIG. 4 shows a flowchart of a method of identification of managed devices through a camera.

FIG. 4 shows a flowchart of a method of identification and alteration of managed devices through the mobile device. The method of FIG. 4 may be implemented during auditing or inventorying of assets as well other situations.

In a first step, a processor receives a recording of a series of frames from a camera imaging at least one managed device for a period of time (step 202). The recording may be taken by a user or a remotely controlled device. An example of a series of recorded frames 120a-120n is shown in FIG. 3 for three different servers 104a, 104b, 104c in a single rack 102a.

The recorded series of frames over a period of time are analyzed to locate the LEDs by determining bright spots exceeding a set threshold and within a set color range (step 204).

An image map of where the bright spots exceeding a set threshold and within a set color range are located is generated (step 205). This allows metadata to be placed accurately on the display and relative to the identified device. The image map is also helpful in tracking the movement of the bright spots when a user may move the camera during recording of a series of frames.

For each of the LEDs located, the changes in the bright spots representing the LED over time is converted into a code. For example, a binary code could be used in which the binary digit 0 is equivalent to "off" and 1 is equivalent to "on". The code is stored in a repository (step 206).

The table below shows the states of LEDs 106a-106c of the three servers 104a-104c in three frames 120a, 120b, 120n and the corresponding identification (ID) code

TABLE 1

| Server Name | Frame 1 | Frame 2 | | Frame N | ID Code |
| --- | --- | --- | --- | --- | --- |
| Server #1 - 104a | On | On | ... | Off | 11 ... 0 |
| Server #2 - 104b | On | Off | ... | On | 10 ... 1 |
| Server #3 - 104c | Off | On | ... | Off | 01 ... 0 |

For server one, the ID code is 11 ... 0, for server two, the ID code is 10 ... 1, for server three, the ID code is 01 ... 0, where the ellipsis indicates that while only three frames are shown here, additional frames may be used to decode a more-than-three-binary-digit code. The more frames per second that the camera can record, the more complex the identification codes can be and the quicker the system can recognize an asset.

The detected code is looked up in a repository in an asset management system (step 208).

If the lookup succeeded (step 210), metadata associated with the managed device associated with the code is retrieved (step 208). The metadata may include, but is not limited to name of the managed device, date installed, date updated, a number of error messages associated with the managed device, software version running on the managed device; type of device, and any other relevant information.

At least some of the metadata of the managed device retrieved in the lookup is displayed over at least one frame of the managed device on the display to the user (step 212) based on the image map generated and the method ends. For example, the metadata displayed may be the type of device and name of the device.

If the lookup was unsuccessful (step 210), then a message is sent to the user regarding the new device for further investigation and possible entry into the asset management system (step 214) and the method ends.

It should be noted that the processor 138 could be remote from a camera 139 in the data center or computer room to scan the devices 100 in the room, and the display 130 used by the user could be in a second remote location.

While the above method has mainly been described as being relevant to a data center and associated devices, the LEDs and identification of devices though the analysis of the LEDs may also be used to track assets in warehouses or other facilities in a retail or in a generally augmented reality application where a live copy and view of a physical, real-world environment has elements or assets that are augmented by computer-generated sensory input.

When a change to an asset in the asset management system is approved through the change and problem management system 115, the correct device or asset needs to be changed in the CMDB 114. An incorrect change to an asset or managed device can be disruptive to the client or customer and can cause a loss of data.

Figure 5A:
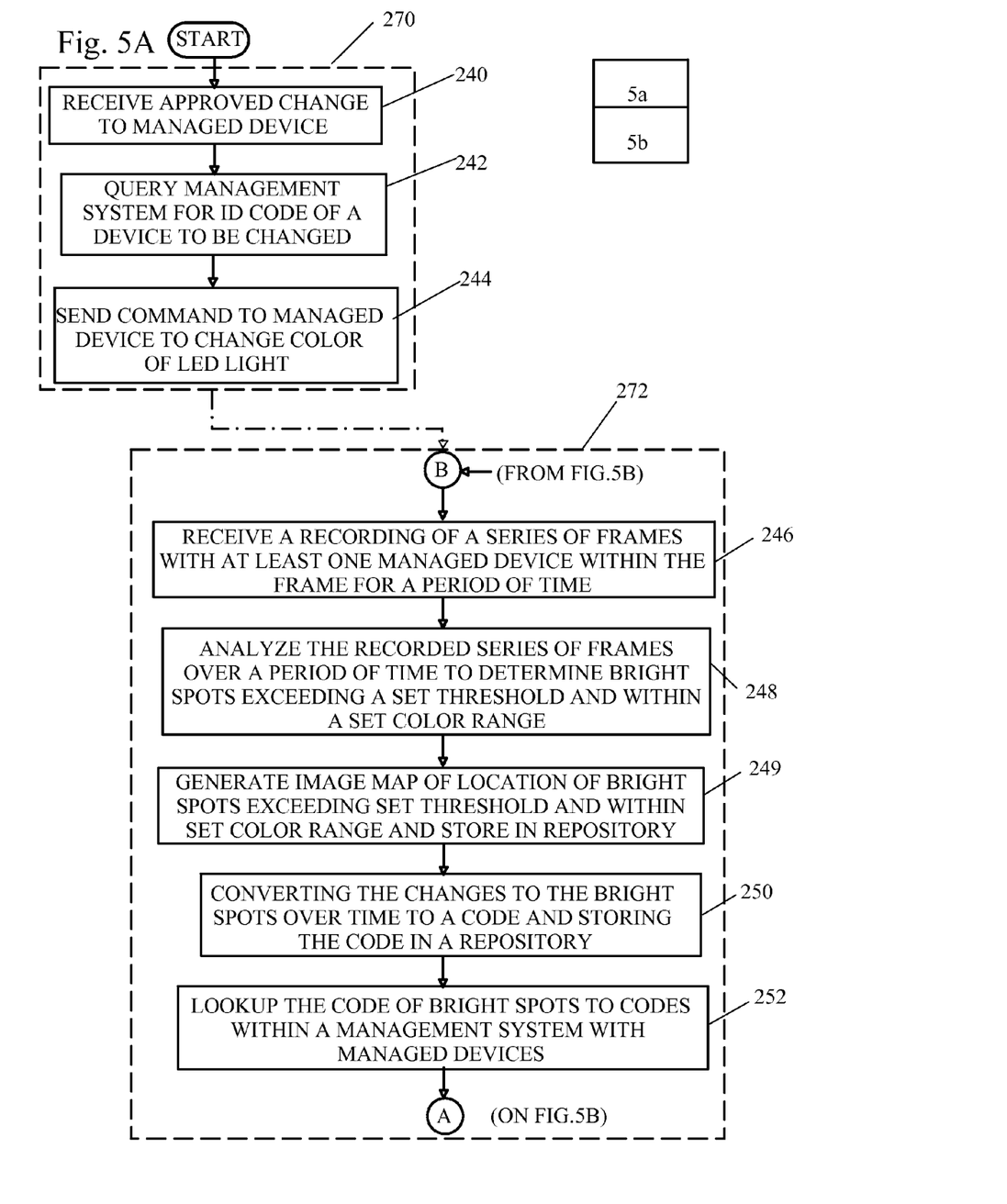
FIGS. 5a-5b show a flowchart of a method of identification and alteration of managed devices through the identification of the managed devices through the light emitting diodes using a camera.
Figure 5B:
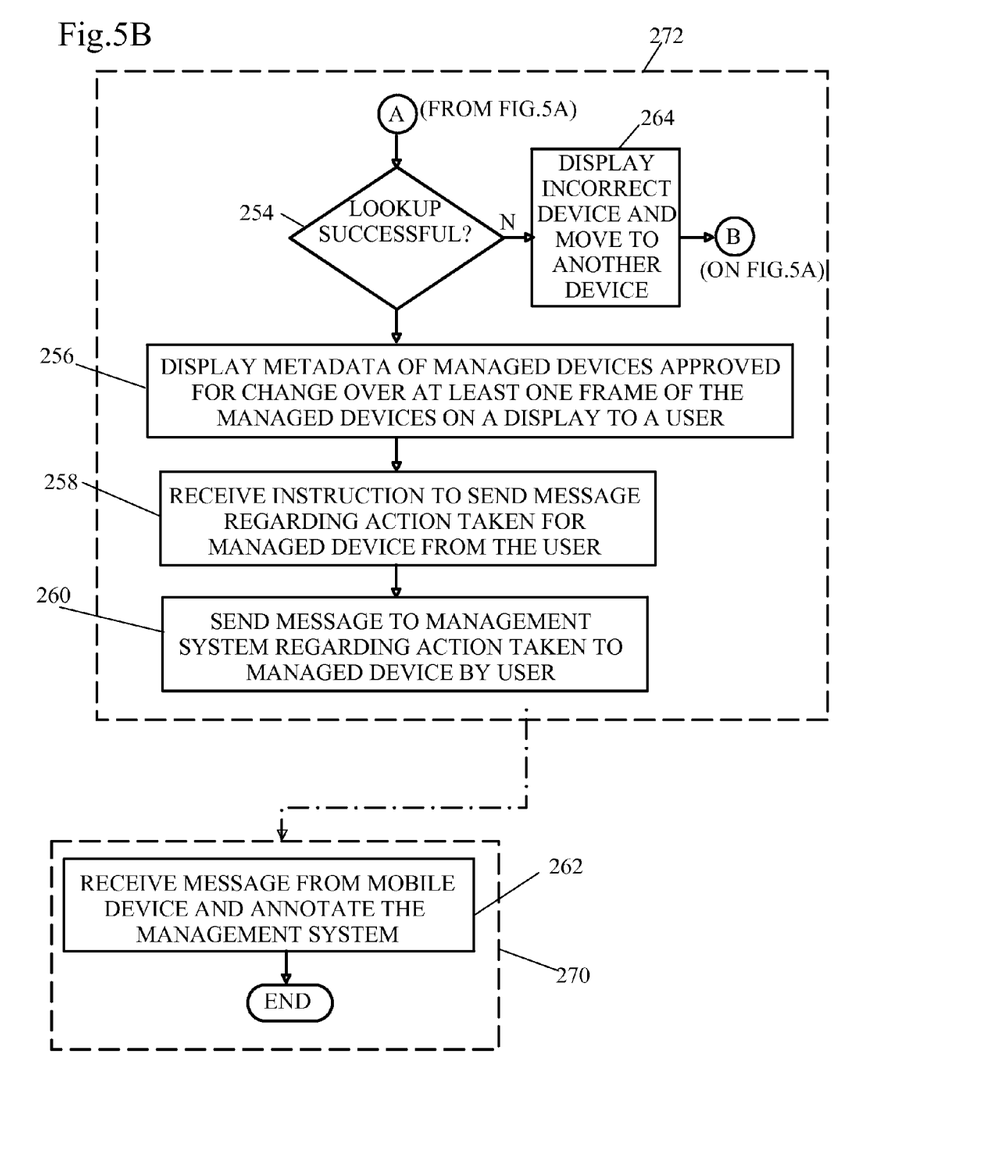

FIGS. 5a-5b shows a flowchart of a method of identification and alteration of managed devices through the identification of the managed devices through the LEDs using a camera linked to a processor or in a mobile device. Colored LEDs may be used and the color data integrated with the associated metadata of the managed devices in the asset management system.

It should be noted that steps 240, 242, 244, 262 are executed by a processor of the asset management system 116 and is indicated by the dashed boxes in FIGS. 5a-5b by the reference number 270. Steps 246, 248, 249, 250, 252, 254, 256, 258, 260, 264 a processor 138 linked to the camera 139 and coupled to one or more computer-readable memories and one or more computer-readable storage medium and a display 130 or by mobile device 108 such as a tablet or smartphone which has at least one processor coupled to one or more computer-readable memories and one or more computer-readable storage medium and is indicated by dashed boxes in FIGS. 5a-5b by reference number 272.

In a first step, an approved change to a managed asset or device is received by the asset management system (step 240). Using the approved change, the asset management system is queried for the identification of the relevant device to be changed (step 242). The asset management system and/or the change and problem management system sends a command to the device to change the color of the LED light (for example, from green to red) to indicate that the specific device is the device to be changed (step 244).

A user can determine that the device is supposed to be changed, for example powered down, by viewing the colored LED light. The user can verify that the device is the correct device to be changed by using a camera in a mobile device to record a series of frames with at least one managed device within the frame for a period of time (step 246). The recorded series of frames over a period of time are analyzed to determine bright spots exceeding a set threshold and within a set color range (step 248).

An image map of where the bright spots exceeding a set threshold and within a set color range are located is generated (step 249). This allows metadata to be placed accurately on the display and relative to the identified device. The image map is also helpful in tracking the movement of the bright spots when a user may move the camera during recording of a series of frames.

The changes in the bright spots over time is converted into a code (step 250). For example, a binary code could be used in which the binary digit 0 is equivalent to "off" and 1 is equivalent to "on". The code is looked up in a repository to see if there is a match between the device in the image and the device which the system has approved for change (step 252).

If the lookup succeeded (step 254), metadata associated with the managed device associated with the code is retrieved (step 252). The metadata can include, but is not limited to: data regarding the device asset information from the asset management system for example name of the managed device, type of device, software version running, date installed, date updated, number of error messages associated with the device, change information from the change management system, for example change number, authorized time period for change, and brief description of the change to be carried out by the user, and any other relevant information.

At least some of the metadata of the managed device retrieved in the lookup is displayed over a frame of the managed device on the display to the user (step 256). For example, name of the managed device, type of device, software version running, date installed, date updated, number of error messages associated with the device, change information from the change management system, for example change number, authorized time period for change, and brief description of the change to be carried out by the user, and any other relevant information and/or just a simple confirmation that confirms that the managed device was approved for the change.

The user then makes the ordered change to the device. The camera or the mobile device receives instructions from the user to send a message to the system regarding the action the user has taken with respect to the managed device (step 258), and the mobile device or camera sends a message to the asset management system indicating what action was taken regarding the asset (step 260). The asset management system and/or change and problem management system accepts the message and annotates the repository 114 accordingly of the asset management system and/or change and problem management system (step 262) and the method ends.

If the lookup was unsuccessful (step 254), a message may be displayed indicating that the device in the image is not the device approved for change (step 264). The user can find another device with the color indication, or request further instructions. If some other device is a possibility, the user repeats steps 246 through 262 to image the other device, look up and verify that device, and proceed if it is the one approved for change.

While the above method has mainly been described as being relevant to a data center and associated devices, the LEDs and identification of devices though the analysis of the LEDs may also be used to track assets in warehouses or other facilities in a retail or in a generally augmented reality application where a live copy and view of a physical, real-world environment has elements or assets that are augmented by computer-generated sensory input.

If visible light is not desired, infra-red LEDs may be used in conjunction with an infra-red camera.

If LEDs are not desirable, other light sources which are able to be rapidly modulated may be used, for example an incandescent or fluorescent light sources in conjunction with a liquid crystal display (LCD) shutter.

It should be noted that the present invention differs from TV remotes that use infra-red LED, since the TV sets use only a single non-image-based sensor and only receive IR radiation generally from the room. Therefore, if two devices (remotes) are transmitting at the same time, the sensor might react to the dominant (brightest) IR signal, or interference can cause some or all of the signals to be blocked. Furthermore, since there is no pixel based frame-by-frame data, it is also not possible to combine the data read with the location in an image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of identification of at least one managed asset having a light, using a camera coupled to a computer comprising at least one processor, one or more memories, one or more computer readable storage media, and a display, the computer in communication with a management system of managed assets which tracks changes to the managed assets via configuration items and relationships between configuration items stored in a configuration management database; the method comprising:
    the management system receiving an approved change to a managed asset;
    the management system searching for identification of the managed asset corresponding to the approved change;
    the management system altering the light of the asset identified for the approved change, wherein the alteration of the light corresponds to a state of the managed asset representative of a configuration item of the managed asset approved for change stored in the configuration management database;
    the computer receiving a series of frames recorded by the camera over a period of time showing at least one asset and associated light;
    the computer analyzing the series of frames to identify lights in each of the frames by detecting bright spots within the image exceeding a set threshold and/or within a set color range;
    for each of the lights identified in the frames, the computer converting changes in the lights in the frames over time into a code;
    the computer looking up the code in a repository in the management system; and
    when the lookup is successful, the computer displaying at least whether the managed asset is the asset approved for change over at least one frame of the image on a display to a user, identifying the managed asset for the user.

2. The method of claim 1, wherein the code is a binary code.

3. The method of claim 1, wherein multiple managed assets are present within the image and associated metadata for all of the managed assets present within the image are displayed to the user.

4. The method of claim 1, wherein the code is unique to one managed asset.

5. The method of claim 1, further comprising the step of the computer generating an image map of a location of the identified lights and using the image map for placement of associated metadata over at least one frame of the image on a display to a user.

6. The method of claim 1, wherein the light displays multiple colors and is changed from displaying a first color to displaying a second color, the change in color being identifiable by the user.

7. The method of claim 1, wherein a change to the managed asset is approved for a period of time.

8. A computer program product for identification of at least one managed asset having a light, using a camera coupled to a computer comprising at least one processor, one or more memories, one or more computer readable storage media, and a display, the computer in communication with a management system of managed assets which tracks changes to the managed assets via configuration items and relationships between configuration items stored in a configuration management database; the computer program product comprising a computer readable storage medium having program instructions embodied therewith, the program instructions executable by the computer of the camera and the management system of the managed assets to perform a method comprising:
    receiving, by the management system, an approved change to a managed asset;
    searching, by the management system, for identification of the managed asset corresponding to the approved change;
    altering, by the management system, the light of the asset identified for the approved change, wherein the alteration of the light corresponds to a state of the managed asset representative of a configuration item of the managed asset approved for change stored in the configuration management database;
    receiving, by the computer, a series of frames recorded by the camera over a period of time showing at least one asset and associated light;
    analyzing, by the computer, the series of frames to identify lights in each of the frames by detecting bright spots within the image exceeding a set threshold and/or within a set color range;
    for each of the lights identified in the frames, converting, by the computer, the changes in the lights in the frames over time into a code;
    looking up, by the computer, the code in the repository in the management system; and
    when the lookup is successful, displaying, by the computer, at least whether the managed asset is the asset approved for change over a frame of the image on a display to a user, identifying the managed asset for the user.

9. The computer program product of claim 8, wherein the code is a binary code.

10. The computer program product of claim 8, wherein multiple managed assets are present within the image and associated metadata for all of the managed assets present within the image are displayed to the user.

11. The computer program product of claim 8, wherein the code is unique to one managed asset.

12. The computer program product of claim 8, further comprising the program instructions of generating, by the computer an image map of a location of the identified lights and using the image map for placement of associated metadata over at least one frame of the image on a display to a user.

13. The computer program product of claim 8, wherein the light displays multiple colors and is changed from displaying a first color to displaying a second color, the change in color being identifiable by the user.

14. The computer program product of claim 8, wherein a change to the managed asset is approved for a period of time.

15. A computer system for identification of at least one managed asset having a light using a camera coupled to a computer comprising a display, the computer in communication with a management system of managed assets which tracks changes to the managed assets via configuration items and relationships between configuration items stored in a configuration management database, and the computer comprising at least one processor, one or more memories, one or more computer readable storage media having program instructions executable by the computer of the camera and the management system of the managed asset to perform the program instructions comprising:
- receiving, by the management system, an approved change to a managed asset;
- searching, by the management system, for identification of the managed asset corresponding to the approved change;
- altering, by the management system, the light of the asset identified for the approved change, wherein the alteration of the light corresponds to a state of the managed asset representative of a configuration item of the managed asset approved for change stored in the configuration management database;
- receiving, by the computer, a series of frames recorded by the camera over a period of time showing at least one asset and associated light;
- analyzing, by the computer, the series of frames to identify lights in each of the frames by detecting bright spots within the image exceeding a set threshold and/or within a set color range;
- for each of the lights identified in the frames, converting, by the computer, the changes in the lights in the frames over time into a code;
- looking up, by the computer, the code in the repository in the management system; and
- when the lookup is successful, displaying, by the computer, at least whether the managed asset is the asset approved for change over a frame of the image on a display to a user, identifying the managed asset for the user.

16. The computer system of claim 15, wherein multiple managed assets are present within the image and associated metadata for all of the managed assets present within the image are displayed to the user.

17. The computer system of claim 15, wherein the code is unique to one managed asset.

18. The computer system of claim 15, further comprising the program instructions of generating, by the computer an image map of a location of the identified lights and using the image map for placement of associated metadata over at least one frame of the image on a display to a user.

19. The computer program product of claim 15, wherein the light displays multiple colors and is changed from displaying a first color to displaying a second color, the change in color being identifiable by the user.

20. The computer system of claim 15, wherein a change to the managed asset is approved for a period of time.

* * * * *